United States Patent
Madawala et al.

(10) Patent No.: US 9,653,207 B2
(45) Date of Patent: May 16, 2017

(54) INDUCTIVE POWER TRANSFER SYSTEM

(75) Inventors: Udaya Kumara Madawala, Manukau (NZ); Duleepa Jayanath Thrimawithana, Auckland (NZ)

(73) Assignee: AUCKLAND UNISERVICES LIMITED, Auckland (NZ)

( * ) Notice: Subject to any disclaimer, the term of this patent is extended or adjusted under 35 U.S.C. 154(b) by 920 days.

(21) Appl. No.: 13/807,436

(22) PCT Filed: Jun. 30, 2011

(86) PCT No.: PCT/NZ2011/000124
§ 371 (c)(1),
(2), (4) Date: Apr. 22, 2013

(87) PCT Pub. No.: WO2012/005607
PCT Pub. Date: Jan. 12, 2012

(65) Prior Publication Data
US 2013/0207482 A1    Aug. 15, 2013

(30) Foreign Application Priority Data

Jun. 30, 2010  (NZ) ........................................ 586526

(51) Int. Cl.
H01F 27/42 (2006.01)
*H01F 38/14* (2006.01)
H02M 3/335 (2006.01)
H02J 5/00 (2016.01)
*H02M 7/797* (2006.01)
H02J 7/02 (2016.01)
H02M 1/00 (2006.01)

(52) U.S. Cl.
CPC .............. *H01F 38/14* (2013.01); *H02J 5/005* (2013.01); *H02M 3/33561* (2013.01); *H02M 7/797* (2013.01); *H02J 7/025* (2013.01); *H02M 2001/007* (2013.01)

(58) Field of Classification Search
USPC ........................................................ 307/104
See application file for complete search history.

(56) References Cited

U.S. PATENT DOCUMENTS

| 7,843,707 B2* | 11/2010 | Chen ...................... H02J 5/005 363/17 |
| 2010/0148723 A1* | 6/2010 | Cook .................... G06K 7/0008 320/108 |
| 2010/0225173 A1* | 9/2010 | Aoyama ............... H02M 3/337 307/104 |
| 2011/0254377 A1* | 10/2011 | Wildmer ............... B60L 11/182 307/104 |

* cited by examiner

Primary Examiner — Danny Nguyen
(74) Attorney, Agent, or Firm — Law Office of Richard F. Jaworski PC (57) ABSTRACT

An inductive power transfer (IPT system) includes an AC-AC full-bridge converter ($T_{p1}$-$T_{p4}$) provided between the primary conductive path ($L_{pt}$) and an alternating current power supply ($V_{in}$). The system may include a controller for controlling the pick-up device to shape the input current drawn from the alternating current power supply ($V_{in}$).

19 Claims, 8 Drawing Sheets

Table I
Matrix converter switching pattern

| Input Voltage | Current Direction | State | Switches on | Vpa | Vpb | Vpi |
|---|---|---|---|---|---|---|
| Positive | NA | 1 | Tp2a,Tp2b,Tp4a,Tp4b | 0 | 0 | 0 |
| Positive | positive | 1-2 | Tp2a,Tp2b,Tp3a,Tp4b | 0 | +Vin | -Vin |
| Positive | negative | 1-2 | Tp2a,Tp2b,Tp3b,Tp4a | 0 | 0 | 0 |
| Positive | NA | 2 | Tp2a,Tp2b,Tp3a,Tp3b | 0 | +Vin | -Vin |
| Positive | positive | 2-3 | Tp1b,Tp2a,Tp3a,Tp3b | 0 | +Vin | -Vin |
| Positive | negative | 2-3 | Tp1a,Tp2b,Tp3a,Tp3b | +Vin | +Vin | 0 |
| Positive | NA | 3 | Tp1a,Tp1b,Tp3a,Tp3b | +Vin | +Vin | 0 |
| Positive | positive | 3-4 | Tp1b,Tp2a,Tp3a,Tp4b | +Vin | +Vin | 0 |
| Positive | negative | 3-4 | Tp1a,Tp2b,Tp3b,Tp4a | +Vin | 0 | +Vin |
| Positive | NA | 4 | Tp1a,Tp1b,Tp4a,Tp4b | +Vin | 0 | +Vin |
| Positive | positive | 4-1 | Tp1b,Tp2a,Tp4a,Tp4b | 0 | 0 | 0 |
| Positive | negative | 4-1 | Tp1a,Tp2b,Tp4a,Tp4b | +Vin | 0 | +Vin |
| Negative | NA | 1 | Tp2a,Tp2b,Tp4a,Tp4b | 0 | 0 | 0 |
| Negative | positive | 1-2 | Tp1b,Tp2a,Tp4a,Tp4b | 0 | 0 | 0 |
| Negative | negative | 1-2 | Tp1a,Tp2b,Tp4a,Tp4b | +Vin | 0 | +Vin |
| Negative | NA | 2 | Tp1a,Tp1b,Tp4a,Tp4b | +Vin | 0 | +Vin |
| Negative | positive | 2-3 | Tp1a,T1b,Tp3a,Tp4b | +Vin | +Vin | 0 |
| Negative | negative | 2-3 | Tp1a,Tp1b,Tp3b,Tp4a | +Vin | 0 | +Vin |
| Negative | NA | 3 | Tp1a,Tp1b,Tp3a,Tp3b | +Vin | +Vin | 0 |
| Negative | positive | 3-4 | Tp1b,Tp2a,Tp3a,Tp3b | 0 | +Vin | -Vin |
| Negative | negative | 3-4 | Tp1a,Tp2b,Tp3a,Tp3b | +Vin | +Vin | 0 |
| Negative | NA | 4 | Tp2a,Tp2b,Tp3a,Tp3b | 0 | +Vin | -Vin |
| Negative | positive | 4-1 | Tp2a,Tp2b,Tp3a,Tp4b | 0 | +Vin | -Vin |
| Negative | negative | 4-1 | Tp2a,Tp2b,Tp3b,Tp4a | 0 | 0 | 0 |

FIG 21

| Parameter | Value |
|---|---|
| $V_{in}$ | 230 $V_{ac}$ |
| $V_{out}$ | 250 $V_{dc}$ |
| Coupling (k) | 0.15 |
| $L_p/L_{p1}=L_{p2}=L_{p3}$ | 18 μH |
| $L_{sp}/L_{sp1}=L_{sp2}=L_{sp3}$ | 18 μH |
| $C_p/C_{p1}=C_{p2}=C_{p3}$ | 3.5 μF |
| $L_s/L_{s1}=L_{s2}=L_{s3}$ | 18 μH |
| $L_{ss}/L_{ss1}=L_{ss2}=L_{ss3}$ | 18 μH |
| $C_s/C_{s1}=C_{s2}=C_{s3}$ | 3.5 μF |

Table 2
Parameters of the Simulated IPT System

FIG 22

INDUCTIVE POWER TRANSFER SYSTEM

REFERENCE TO RELATED APPLICATIONS

The present disclosure is based on and claims benefit from PCT Publication Number WO 2012/005607, which corresponds to International Application Number PCT/NZ2011/000124 filed on Jun. 30, 2011 which claims benefit from New Zealand application 586526 filed Jun. 30, 2010, the entire contents of each of which are herein incorporated by reference.

FIELD OF THE INVENTION

This invention relates to Inductive Power Transfer (IPT) systems, and has particular, but not necessarily exclusive, application to bi-directional IPT systems.

BACKGROUND

Sustainable generation, transmission, distribution and utilization of energy have all become a priority for addressing global concerns in relation to both depletion and irresponsible use of fossil fuel reserves. Encouragements with intensives for wider exploitation of renewable resources can be considered as an integral part of this mission. As a result, over the past several years many large renewable energy plants have been built and incorporated into the main power network. This trend soon changed in favour of decentralized energy generation or sometimes referred to as distributed generation (DG). More recently, DG systems became Green Energy (GE) systems being solely based on renewable or Green energy sources through which more economic, environmental and sustainability benefits can be achieved. A GE system, which typically derives power from wind, solar or bio-gas, is operated at either medium or low power levels and allows the energy to be consumed or grid-connected at or near the point of generation. A medium power GE system is usually capable of supplying power for industry, large offices and community complexes, whilst a low power GE unit would be of a power level that is adequate to power either grid-connected or stand-alone houses, farms, lighthouses and telecommunications facilities.

Power generation through GE system is unpredictable in nature due mainly to the dependence of renewable energy sources on climate conditions. Some form of energy storage is therefore an essential and integral part of most, if not all, GE systems as it allows both storage and retrieval of energy when necessary. Electric Vehicles (EVs) have recently emerged as one way forward for clean or green transport, and also means for addressing energy fluctuations in the power network. The latter became popular as vehicle-to-grid (V2G) power. Although EVs are primarily considered as a method of clean transport, they can also be used in GE systems to supplement the energy storage, and such systems have been referred to as 'Living & Mobility'. Irrespective of the application, an EV essentially requires some form of a power interface to the grid or power supply to charge its battery storage. In situations, where the battery storage of an EV is used for both V2G and G2V applications, or to supplement an existing battery storage as in the case of 'Living & Mobility', the power interface should necessarily be bi-directional to allow for both charging and discharging of the vehicle. A hard-wired power interface between the EV and the grid is simple and can be used to either charge or discharge batteries but such wired interfaces are now considered to be inconvenient and inflexible, and pose safety concerns. Wireless or contactless power interfaces have thus become an attractive alternative for charging and/or discharging EVs. Amongst the existing wireless power transfer technologies, Inductive power Transfer (IPT) is a key technology that has widely been accepted as suitable for charging/discharging EVs or V2G and G2V applications IPT systems produce voltages and currents at a much higher frequency in contrast to low grid frequency. Therefore existing IPT systems essentially require an additional low-frequency DC-AC converter stage for grid integration with bi-directional power flow.

The additional converter stage with a DC link capacitor significantly increases the system cost and complexity, and reduces the efficiency and reliability.

OBJECT

It is an object of the present invention to at least ameliorate one or more of the disadvantages of the prior art, or to at least provide the public with a useful alternative.

SUMMARY

Accordingly in one aspect the invention provides an inductive power transfer (IPT system) comprising:
- a primary conductive path adapted to provide a magnetic field for reception by a pick-up device, and;
- an AC-AC full-bridge converter provided between the primary conductive path and an alternating current power supply to provide a controlled current to the primary conductive path for provision of the magnetic field.

Preferably the system includes a controller for controlling the pick-up device to shape the input current drawn from the alternating current power supply.

Preferably the controller modulates the pick-up device to shape the input current drawn from the alternating current power supply.

Preferably the pick-up includes a full-bridge converter having two pairs of complementary switches, and the controller controls the pick-up by controlling the phase angle between the pairs of complementary switches.

Preferably the alternating current power supply comprises a mains utility power supply.

Preferably the system comprises a bi-directional IPT system.

Preferably the AC-AC converter connects the alternating supply to the primary inductive path to provide a current in the primary conductive path having a frequency which is greater than the frequency of the alternating current supply when power is being transferred to the pick-up device.

Preferably the AC to AC converter connects the primary conductive path to the alternating current supply to provide a current to the alternating current supply having a frequency which is less than the frequency of the current in the primary conductive path when power is being transferred to the alternating current supply.

In a further aspect the invention provides a primary circuit for an IPT system, the primary circuit including a primary conductive path adapted to provide a magnetic field for reception by a pick-up device, and an AC-AC converter provided between the primary conductive path and an alternating current power supply.

Preferably the alternating current power supply composes a mains utility power supply.

Preferably the primary circuit comprises part of a bi-directional IPT system.

Preferably the AC-AC converter connects the alternating supply to the primary inductive path to provide a current in the primary conductive path having a frequency which is greater than the frequency of the alternating current supply when power is being transferred to an IPT pick-up device.

Preferably the AC to AC converter connects the primary conductive path to the alternating current supply to provide a current to the alternating current supply having a frequency which is less than the frequency of the current in the primary conductive path when power is being transferred from an IPT pick-up device to the alternating current supply.

In a further aspect the invention provides a method for controlling an inductive power transfer (IPT) system having an AC to AC full-bridge converter provided between an AC power supply and a primary conductive path, the method comprising:

controlling a pick-up device of the IPT system to shape the input current drawn from the alternating current power supply.

Preferably the method includes modulating the operation of the pick-up device to shape the input current drawn from the alternating current power supply.

Preferably the pick-up includes a full-bridge converter having two pairs of complementary switches, and the method includes controlling the pick-up by controlling the phase angle between the pairs of complementary switches.

Preferably the alternating current power supply comprises a mains utility power supply.

Preferably the system comprises a bi-directional IPT system.

Preferably the method includes controlling the AC-AC converter to connect the alternating supply to the primary inductive path to provide a current in the primary conductive path having a frequency which is greater than the frequency of the alternating current supply when power is being transferred to the pick-up device.

Preferably the method includes controlling the AC-AC converter to connect the primary conductive path to the alternating current supply to provide a current to the alternating current supply having a frequency which is less than the frequency of the current in the primary conductive path when power is being transferred to the alternating current supply.

In another aspect, the invention broadly consists in a primary circuit for an IPT system, the primary circuit including a primary conductive path adapted to provide a magnetic field for reception by one or more pick-up devices, a matrix bridge converter provided between the primary conductive path and an alternating current power supply, and a control means adapted to control switches of the converter to connect the alternating current supply to the primary conductive path.

Preferably the control means controls complimentary switches of the bridge-matrix converter to provide two voltages, one voltage being applied to one end of the primary conductive path and the other voltage being applied to the other end of the primary conductive path, the control means providing a controlled phase delay between the two voltages so as to control the voltage applied to the primary conductive path.

In one embodiment the primary conductive path includes one or more reactive elements.

Preferably the primary conductive path comprises an LCL network, or an appropriate var or reactive energy compensation network.

In a further aspect the invention broadly provides a method for controlling an IPT system including a bridge-matrix converter provided between a AC power supply of the and a magnetic field producing or receiving circuit whereby complementary switches of the bridge-matrix converter are controlled to provide first and second voltages, the first and second voltage being provided to the field producing or receiving circuit, and the control means controlling the phase difference between the voltages so as to control the current in the field producing or receiving circuit.

Preferably the field producing or receiving circuit comprises an LCL circuit.

Preferably, the IPT system as set forth in any one of the preceding statements may comprise a multiphase IPT system.

Preferably, the matrix converter as set forth in any one of the preceding statements may comprise a multiphase matrix converter.

Advantageously, use of a multiphase IPT system results in lower power losses and lower current ripple.

Preferably, the IPT system as set forth in any one of the preceding statements may include multiple primary supplies and/or or primary conductive paths, and/or multiple pick-ups and/or multiple pick-up windings.

Preferably, the IPT system according to any one of the preceding statements includes a primary and/or pick-up which may be an active load or a passive load. Therefore, for example, the primary maybe connected to an AC load.

Preferably, the IPT system according to any one of the preceding statements can be used in both stand-alone and grid-connected modes.

Further aspects of the invention will become apparent from the following description.

For convenience the term "matrix converter" is used in this document. This term is intended to refer to any type of single phase (or where appropriate polyphase) full-bridge AC-AC converter.

The invention thus provides a technique that allows for direct integration of an IPT system to the grid without an additional converter stage. This is attractive and more appropriate than existing systems which use a low frequency DC-AC converter stage. This document therefore proposes a novel single-stage IPT power interface that is suitable for direct grid integration. The proposed IPT grid interface utilizes a matrix converter to eliminate an additional low frequency power conversion stage. Such a matrix converter based IPT topology or a control strategy has not been previously disclosed or suggested. Mathematical analysis and simulation results are presented for a single-phase bidirectional IPT system for example, to show that the proposed technique is viable and requires a simple control strategy to effectively control both direction and amount of power flow. Without an additional power conversion stage, the IPT power interface is low in cost, low in power losses and ideal for wireless charging and discharging of single or multiple EVs or V2G applications. Although the invention is described by way of example with reference to a bi-directional IPT system, those skilled in the art will appreciate that the invention is also applicable to uni-directional systems. The invention may also be implemented in polyphase systems.

DRAWING DESCRIPTION

One or more embodiments of the invention will be described further below by way of example with reference to the accompanying drawings, in which:

FIG. 21 is a table illustrating Switching Patterns according to embodiments of the present disclosure.

FIG. 22 is a table illustrating Design Parameters according to embodiments of the present disclosure.

DESCRIPTION OF ONE OR MORE EMBODIMENTS

A Typical Grid-Connected IPT System

Figure 1:
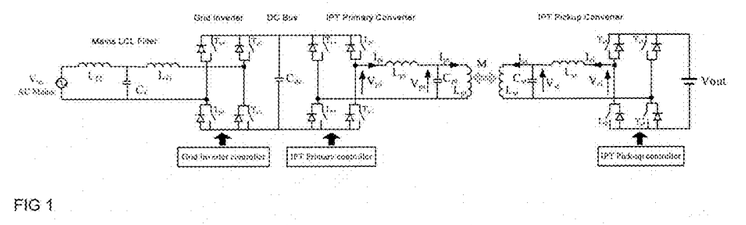
FIG. 1 is a conventional grid connected bi-directional IPT system

A typical grid connected bi-directional IPT system is schematically shown in FIG. 1. As illustrated in the diagram, the primary IPT circuit, which comprises a full-bridge converter (commonly known as an active front end, reversible rectifier or a controlled rectifier) and a tuned LCL circuit, derives power from the DC bus and generates a track current in the primary conductive path or track $L_{pt}$, which is loosely coupled to the pick-up winding ($L_{st}$) or the secondary pick-up circuit. The output of the pick-up circuit can be connected to an active load that is capable of consuming or generating power, which is represented as a DC supply in FIG. 1. The primary and pick-up circuits are implemented with virtually identical electronics, which include a full-bridge converter and atoned LCL circuit, to facilitate bidirectional power flow between the primary supply and the pick-up load. Each LCL circuit is tuned to the track frequency, which is generated by the primary full-bridge converter and is typically around 10-50 kHz. Both full-bridge converters are operated at the same frequency either in the inverting or rectifying mode, depending on the direction of the power flow. Voltages and phase angle between the full-bridge converter will determine the amount and direction of power flow. Although the word "track" is used in this document to refer to the primary conductive path which is primarily represented by $L_{pt}$, this may take a variety of physical forms, for example, it may consist of a winding or an elongate loop, or multiple windings. The primary conductive path may also include additional elements such as $L_{pi}$ and $C_{pt}$, i.e. it may comprise the LCL circuit. As evident from FIG. 1, an additional full-bridge converter stage, indicated as "grid inverter", is used to interface the IPT converter to the utility grid. The grid inverter is controlled to maintain a constant DC bus voltage either by extracting power from the grid or delivering power to the grid. When the IPT supply is delivering power to the load, the grid inverter functions as an active rectifier, whereas when the power flow is reversed it works as an inverter generating power at grid frequency. The introduction of a separate grid inverter creates switching losses and requires a sophisticated control subsystem. Furthermore, the grid inverter requires a large inductor ($L_{fl}$) to regulate the ripple current drawn or supplied to the grid and a significantly large DC bus capacitance to minimize voltage ripples. Consequently, conventional grid connected IPT system are significantly more expensive, have higher losses and tend to be bulky.

Proposed Matrix Converter Based IPT System

Figure 2:
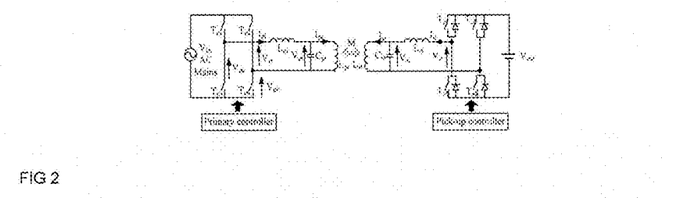
FIG. 2 is a bi-directional IPT system according to one embodiment of the present invention

The shortcomings of a conventional grid connected IPT power interface can be alleviated by employing a matrix converter, which replaces bath the grid and primary side full-bridge converter at the IPT system in FIG. 1. Both the primary and pick-up can either be an active source or a passive load. Note that in this situation the EV or the pick-up output is represented by a battery as an active source. A schematic of this proposed IPT topology is depicted in FIG. 2. Since the primary side full-bridge converter is directly connected to the utility grid, bi-directional switches $T_{p1}$-$T_{p4}$ are used to drive the primary LCL circuit of the proposed system at a suitable track frequency. Moreover, the proposed topology eliminates the need for large and expensive DC-bus capacitors. An inductor between the grid and the primary converter is not required to control the power flow between the grid and load of this topology, due to inherent current sourced nature of the proposed IPT system. However, a smaller π-filter network may be desirable at the input to attenuate the high frequency switching noise, generated by the matrix converter to an acceptable level.

Steady State Analysis

According to FIG. 2, the matrix converter produces a symmetrical bipolar square wave voltage $V_{pi}$ to drive the LCL resonant circuit of the primary supply at a suitable track frequency, $f_T$. A square wave voltage $V_{pa}$ that has an approximate magnitude of $|V_{in} \cdot \sin(\omega_L t)|$ at 50% duty cycle is generated by switching bi-directional switches $T_{p1}$ and $T_{p3}$ at frequency $f_T$. Similarly, a voltage $V_{pb}$ that is delayed in phase by $\phi_1$ radians with respect to $V_{pa}$ is generated by using switches $T_{p2}$ and $T_{p4}$. The phase delay between $V_{pa}$ and $V_{pb}$ is controlled to regulate the average voltage that appears across the LCL resonant circuit. A phase delay of 0 degrees corresponds to a short-circuit across $V_{pi}$ whereas a phase delay of 180 degrees corresponds to maximum $V_{pi}$. As such fundamental and harmonics of $V_{pi}$ are a function of $\phi_1$ and the input voltage $|V_{in} \cdot \sin(\omega t)|$ as given by, $$V_{pi} = -|V_{in}\sin(\omega_L t)| \frac{4}{\pi} \sum_{n=1,3\ldots}^{\infty} \frac{1}{n} \cos\left(n\omega_T t + \frac{n\varphi_1}{2}\right) \sin\left(\frac{n\varphi_1}{2}\right) \quad (1)$$

where $\omega_L$ is the mains angular frequency and $\omega_T = 2\pi f_T$.

Figure 3:
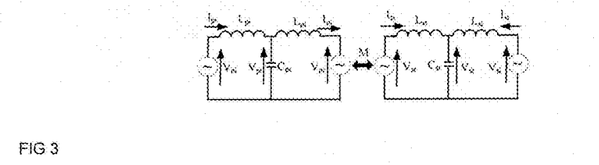
FIG. 3 is an equivalent circuit model of the system of FIG. 2

An equivalent circuit model that can be used to analyze the steady state operation of this converter is illustrated in FIG. 3. The LCL circuits in the primary and the pick-up are both tuned to the track frequency ($f_t$) and therefore, $$\omega_T^2 = (2\pi f_T)^2 \quad (2)$$

$$= \frac{1}{L_{pt}C_{pt}}$$

$$= \frac{1}{L_{pi}C_{pt}}$$

$$= \frac{1}{L_{si}C_{st}}$$

$$= \frac{1}{L_{si}C_{st}}$$

Therefore ignoring the induced voltage $V_{pr}$ due to $I_{st}$ in the receiving coil $L_{st}$, the track current $I_{pt}$ can be given by, $$\hat{I}_{pt} = -j\frac{\hat{V}_{pi}}{\omega L_{pt}(2 - \omega^2 L_{pt}C_{pt})} \quad (3)$$

An expression for $I_{pt}$ in terms of $V_{in}$ can be obtained by substituting (1) in (3) as given below, $$I_{pt} = -|V_{in}\sin(\omega_L t)|\frac{4}{\pi}\sum_{n=1,3...}^{\infty}\left\{\frac{1}{n^2\omega_T L_{pt}(2-n^2)}\times \sin\left(n\omega_T t + \frac{n\varphi_1}{2}\right)\sin\left(\frac{n\varphi_1}{2}\right)\right\} \quad (4)$$

Figure 4:
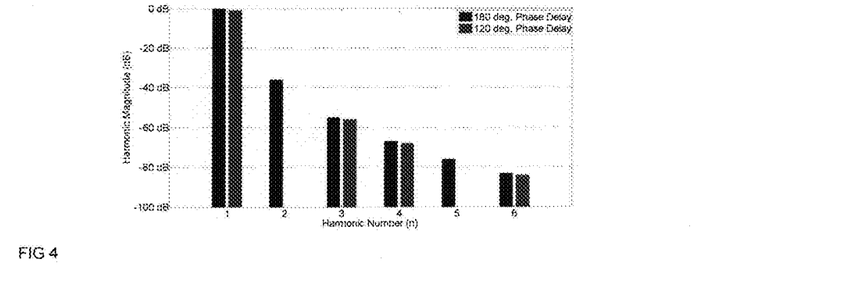
FIG. 4 is a diagram of normalised magnitude spectrum of current in the primary of the system of FIG. 2 for two different phase angles implemented in the matrix converter.

The normalized magnitude spectrum of $I_{pt}$ for two different $\phi$ values is shown in FIG. 4. It is evident from FIG. 4 that harmonics of $I_{pt}$ are significantly attenuated by the LCL tuned circuit. Furthermore the 3$^{rd}$ harmonic of $I_{pt}$ is nullified when the phase delay between $V_{pa}$ and $V_{pb}$ is 120 degrees. For example, when the phase delay is 120 degrees the largest harmonic current generated is approximately 55 dB smaller than the fundamental of the track current. Similarly it can be shown that the harmonic currents of $I_{st}$ are significantly smaller than the fundamental. Therefore to simplify the analysis, $I_{pt}$ and $I_{st}$ are assumed to be ideal sinusoidal currents. If $I_{pt}$ and $I_{st}$ are considered to be ideal sinusoidal currents, then the voltages induced in the track and pick-up inductor, denoted by $V_{pr}$ and $V_{sr}$, respectively, are sinusoidal voltages with a frequency of $f_T$. Thus $I_{pt}$ and $I_{st}$ are independent of the induced voltages and can be given by, $$I_{pt} = -|V_{in}\sin(\omega_L t)|\frac{4}{\pi\omega_T L_{pt}}\sin\left(\omega_T t + \frac{\varphi_1}{2}\right)\sin\left(\frac{\varphi_1}{2}\right) \quad (5)$$

$$I_{st} = -V_{out}\frac{4}{\pi\omega_T L_{st}}\sin\left(\omega_T t + \theta + \frac{\varphi_2}{2}\right)\sin\left(\frac{\varphi_2}{2}\right) \quad (6)$$

where $\theta$ is the relative phase difference between $V_{pi}$ and $V_{si}$, which is used to control the direction and the magnitude of power flow.

The induced voltages on the primary and the pick-up are given by, $$V_{pr} = -V_{out}\frac{4M}{\pi L_{st}}\cos\left(\omega_T t + \theta + \frac{\varphi_2}{2}\right)\sin\left(\frac{\varphi_2}{2}\right) \quad (7)$$

$$V_{sr} = -|V_{in}\sin(\omega_L t)|\frac{4}{\pi L_{pt}}\cos\left(\omega_T t + \frac{\varphi_1}{2}\right)\sin\left(\frac{\varphi_1}{2}\right) \quad (8)$$

The input current drawn by the primary is affected by both $V_{pi}$ and $V_{pr}$, and is given by, $$\hat{I}_{pi} = \frac{1}{j\omega L_{pt}}\left(\frac{1-\omega^2 L_{pt}C}{2-\omega^2 L_{pt}C}\hat{V}_{pi} - \hat{V}_{pr}\right) \quad (9)$$

Substituting (1) and (7) in (9) results in, $$I_{pi} = -V_{out}\frac{4M}{\pi\omega_T L_{pt}L_{st}}\sin\left(\omega_T t + \theta + \frac{\varphi_2}{2}\right)\sin\left(\frac{\varphi_2}{2}\right) - \quad (10)$$

$$|V_{in}\sin(\omega_L t)|\times\frac{4}{\pi\omega_T L_{pt}}\sum_{n=1,3...}^{\infty}\frac{1-n^2}{n^2(2-n^2)}\sin\left(n\omega_T t + \frac{n\varphi_1}{2}\right)\sin\left(\frac{n\varphi_1}{2}\right)$$

From (1) and (10) it can be seen that only the terms with the fundamental track frequency contribute to real power flow from $V_{pi}$. The output power averaged over a single switching cycle of the track frequency can be given by, $$P_o = \frac{M}{\omega_T L_{pt}L_{st}}\frac{8}{\pi^2}|V_{in}\sin(\omega_L t)|V_{out}\sin(\theta)\sin\left(\frac{\varphi_1}{2}\right)\sin\left(\frac{\varphi_2}{2}\right) \quad (11)$$

The average power flow into the IPT system over one cycle at grid frequency can therefore be given by, $$P_{o,avg} = \frac{M}{\omega_T L_{pt}L_{st}}\frac{16}{\pi^3}V_{in}V_{out}\sin(\theta)\sin\left(\frac{\varphi_1}{2}\right)\sin\left(\frac{\varphi_2}{2}\right) \quad (12)$$

From (12) it is evident that maximum power transfer takes place when the phase delay $\theta$ between the primary and pick-up full-bridge converter is ±90°. A leading phase angle constitutes power transfer from the pick-up to the grid while a lagging phase angle enables power transfer from the grid to the pick-up. Furthermore, the magnitude of the power transferred between the grid and the load can be regulated by controlling $\phi_1$ and $\phi_2$, the phase shift in switches of the primary and pick-up full-bridge converters respectively. Therefore, for a given input and output voltage, both the amount and direction of power flow between the track and the pick-up can be regulated by controlling either the magnitude or phase angle of the voltage generated by the primary and pick-up full-bridge converters.

Implementation of the Converter

Figure 5:
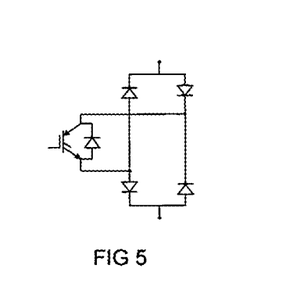
FIGS. 5 and 6 are diagrams of possible bi-directional switches for use in a matrix converter.
Figure 6:
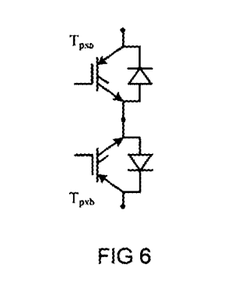
Figure 7:
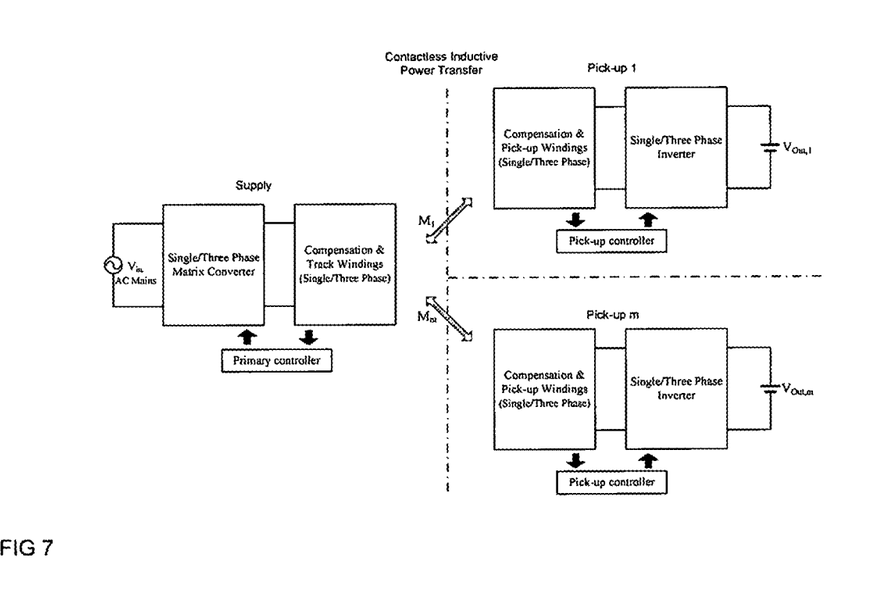
FIG. 7 is a diagram of a generalised matrix converter based IPT system which facilitates direct AC to AC conversion.

As depicted in FIG. 1, both the primary and the pick-up of the IPT system consist of a full-bridge converter which drives a tuned LCL circuit. Since the pick-up is supplying a DC load, a standard full-bridge converter is utilised in the pick-up to regulate the power transfer. However, the switches of the primary full-bridge converter $T_{p1}$-$T_{p4}$ are bi-directional switches, which can be realised using standard IGBTs/MOSFETs as indicated in FIG. 5. Bi-directional IGBT switch modules are available from a few manufacturers. The control algorithm discussed below is based on an IPT system that uses a Matrix converter with bi-directional switches as indicated in FIG. 6. For this discussion, the top switch of the AC switch is named $T_{pxa}$ and the bottom switch is named $T_{pxb}$ where x is the switch number. Therefore for example $T_{p1}$ would be made up of two switches $T_{p1a}$ and $T_{p1b}$. However this can be extended to cater for any alternative implementations of AC-AC converters. Although this example illustrates the use of this concept for a single-phase single-pick-up bi-directional IPT system, it will be apparent to those skilled in the art that this can be extended to cater for three-phase or/and multi-pick-up unidirectional/bi-directional systems. A generalised diagram of a matrix converter based IPT system is illustrated in FIG. 7. As can be seen from FIG. 7, the single primary circuit may be loosely coupled to a single pick-up, or to multiple pick-ups.

Control Algorithm

The primary inverter/rectifier, which is a matrix converter, is operated to generate a suitable track current at the tuned frequency $f_T$. In case of a single pick-up system the track current can be variable allowing it to optimize the track current with load to minimize losses. However in multi-pick-up systems a constant track current may be preferred to supply all the pick-up loads optimally. The output voltage $V_{pi}$ produced by the matrix converter to drive the LCL resonant tank is controlled either through a PWM or a phase modulation strategy to regulate the track current $I_{pt}$ accordingly. Although PWM techniques help reduce the harmonic contents in $V_{pi}$ the switching losses may be elevated due to high switching frequencies, Phase-modulation allows the converter switches to be operated at $f_T$ thereby reducing switching losses but harmonic content in $V_{pi}$ is significantly higher. The discussion presented here is based on phase-modulation but can be easily adopted to suit PWM switching schemes.

As alluded to above, in phase-modulated control, complimentary switches of the matrix converter $T_{p1}$ and $T_{p3}$ are operated as a pair to produce a voltage $V_{pa}$ whereas complimentary switches $T_{p2}$ and $T_{p4}$ are operated as a pair to produce a voltage $V_{pb}$. Both $V_{pa}$ and $V_{pb}$ are square-wave signals with a frequency of $f_T$ and a duty cycle of 50%. The output voltage $V_{pi}$ is the difference between $V_{pa}$ and $V_{pb}$ and thus can be regulated by changing the relative phase between $V_{pa}$ and $V_{pb}$. If the phase difference between $V_{pa}$ and $V_{pb}$ is $\phi_1$ then the output voltage produced by the matrix converter can be given by equation (1).

Therefore it can be seen that a phase difference of 180 degrees corresponds to maximum $V_{pi}$ whereas a phase delay of 0 degrees corresponds to 0 V across $V_{pi}$. The track current $I_{pt}$ is related to $V_{pi}$ and thus $I_{pt}$ can be regulated to a desired value by controlling the phase difference between $V_{pa}$ and $V_{pb}$, $\phi_1$. In case of an LCL compensated primary as illustrated in FIG. 1 the track current can be given by equation (5) above.

The matrix converter does not provide inherent current freewheeling paths. Therefore in addition to phase-modulated control of $V_{pi}$, during commutation of the bi-directional switches, the control algorithm should be capable of providing forced freewheeling paths for the current to flow. The proposed control scheme monitors the full-bridge converter current $I_{pi}$, and input voltage $V_{in}$ and decides the switching pattern as summarised in Table 1 (see FIG. 21). As evident from the table the switching pattern of the converter during the positive half cycle of the input voltage is the inverse of the pattern used during the negative half cycle of the input voltage thereby avoiding the 180 degree phase transition that could occur in the track current.

Figure 8:
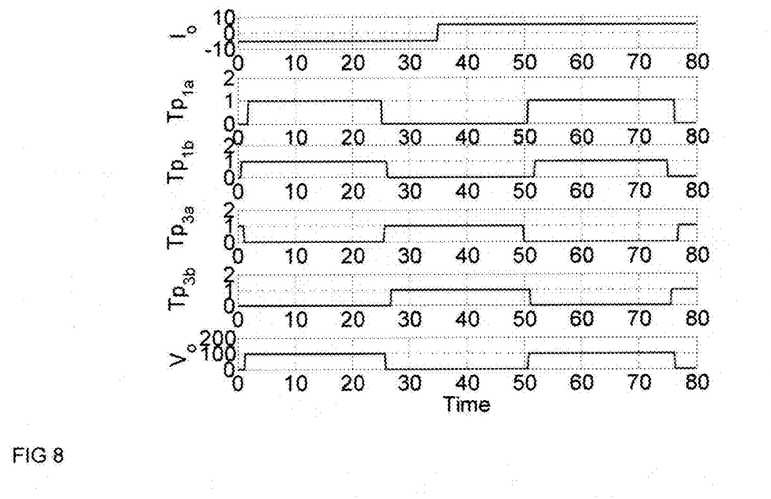
FIG. 8 is a switching pattern diagram.

FIG. 8 below illustrates the switching pattern of the switches $Tp_1$ and $Tp_3$ for both positive and negative currents in the matrix converter. As evident from FIG. 8 the proposed switching pattern provides two freewheeling paths for the current during each switch commutation.

The pick-up full-bridge converter, which will be supplying a DC load, will be controlled using the same phase-modulation technique to regulate the pick-up inductor current $I_{st}$. If the phase delay between the two switch pairs in the pick-up is $\phi_2$ then the current $I_{st}$ produced by the pick-up full-bridge converter is given by equation (6) above. In (6) the phase-shift $\theta$ is the phase difference between the primary and pick-up converters voltages $V_{pi}$ and $V_{si}$.

Under the above conditions the input current supplied by the primary full-bridge converter can be given by equation (10) above.

Thus the power transferred between the grid and the pick-up load can be calculated and is given in equation (11). As evident from (11) the direction and magnitude of power flow can be regulated by controlling the phase-shift $\theta$. A leading phase-shift constitutes power transfer from the pick-up to the grid while a lagging phase angle enables power transfer from the grid to the pick-up. Furthermore, maximum power transfer between the grid and the pick-up load takes place when the phase-shift $\theta$ between the primary and pick-up full-bridge converter is ±90 degrees and under this condition the reactive power supplied/received by the grid is ideally zero. Thus in some situations it is advantageous to operate the IPT system at a fixed phase-shift of ±90 degrees that is determined by the direction of power transfer, and control the magnitude of power flow by regulating either/both $\phi_1$ or/and $\phi_2$.

Figure 9:
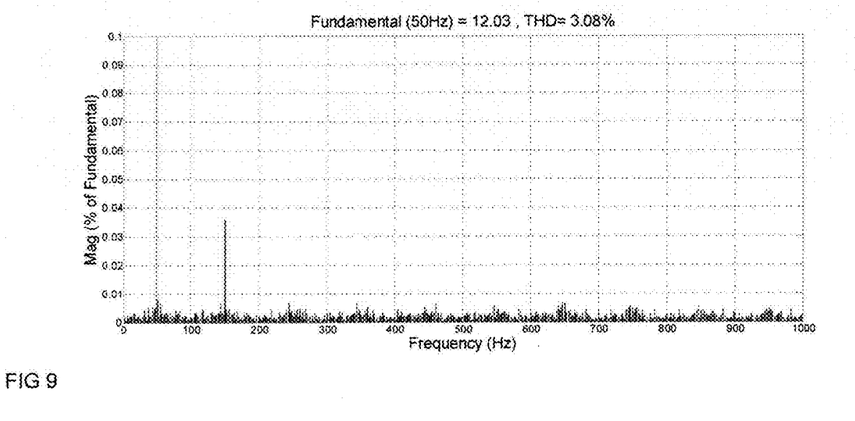
FIG. 9 is a diagram of harmonic currents at the mains input for a converter as shown in the previous drawings.

This system will produce a significant amount of mains harmonic currents at the input if both the primary and the pick-up are operated with fixed steady state values of $\phi_1$ and $\phi_2$ as the input current under such conditions is nearly a square-wave. This can be resolved by operating either/both primary or/and pick-up full-bridge converters with variable $\phi_1$ and $\phi_2$ to shape the input current drawn by the system. In particular, an unexpected benefit of the use of an AC-AC converter between the AC supply and the primary conductive path $L_{pt}$ is that the pick-up full-bridge converter ($T_{s1}$-$T_{s4}$) can be used to shape the input current drawn from the AC supply to which the AC-AC converter is connected. This cannot be achieved with the prior art converter topologies used in IPT systems since they require the presence of a DC capacitor between the alternating current power supply and the primary conductive path. FIG. 9 illustrates the harmonic contents of the input current drawn by this proposed IPT system when the pick-up phase delay $\phi_2$ is modulated to shape the input current to follow the grid voltage. As evident from the diagram the THD produced by this converter is below the limits set by IEEE standards for grid connected full-bridge converters. Most of the harmonic energy is contained in frequencies higher than the track frequency which can easily be filtered to improve the THD further.

Figure 10:
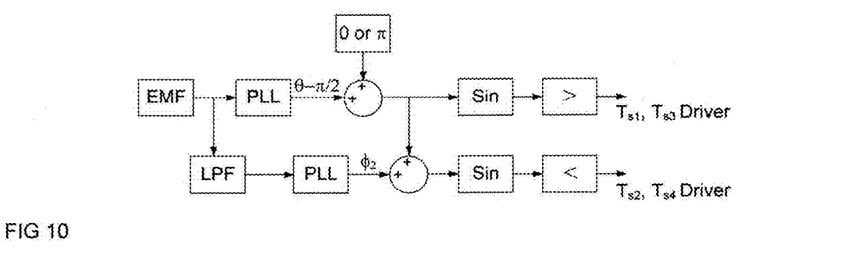
FIG. 10 is one example of a pick-up controller.
Figure 11:
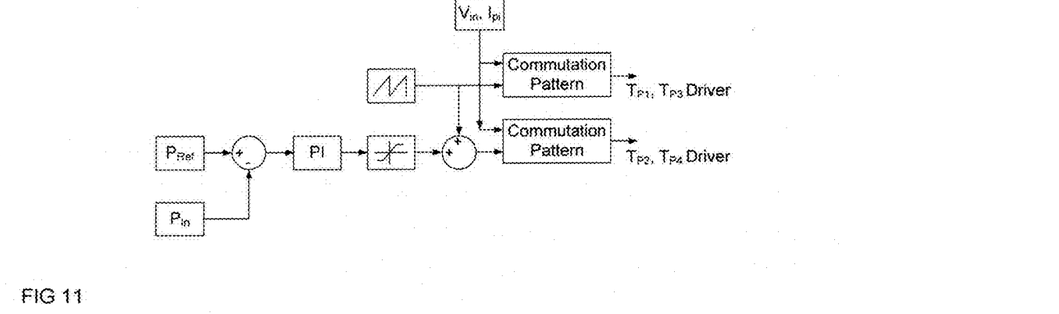
FIG. 11 shows one example of a primary controller

There are many possible control algorithms that can be implemented to achieve above mentioned control tasks. FIG. 10 illustrates one such algorithm which is used by the pick-up of the IPT system considered in this example. EMF induced across a sense winding is used to obtain the phase of the track current $I_{pt}$ and a PLL is used to produce a reference angle that is synchronized with this EMF. This signal produced by the PLL is delayed in phase by 0 or 180 degrees, which corresponds to a phase-shift $\theta$ of −90 or +90 degrees respectively, is used to drive the switches $T_{s1}$-$T_{s4}$. The phase delay $\phi_2$ of the pick-up full-bridge converter is modulated using a reference angle that is in-phase with the mains frequency. The power throughput of the converter is regulated by controlling the track current by varying $\phi_1$ of the matrix converter. An example controller diagram for the primary is given in FIG. 11. As an alternative the power controller can be integrated to the pick-up controller and the input current shaping can be achieved through the primary controller.

Simulation Results

A 2.8 kW matrix converter based grid-connected IPT system capable of transferring bi-directional power has been designed and simulated in MATLAB Simulink™, and results are presented to verify the viability of the proposed concept. The primary of the system is powered by a 230 $V_{ac}$ source and the pick-up is connected to a 250 V battery, representing an EV or an active load. A complete set of design parameters of the simulated system is given in Table 2(see FIG. 22).

Figure 12:
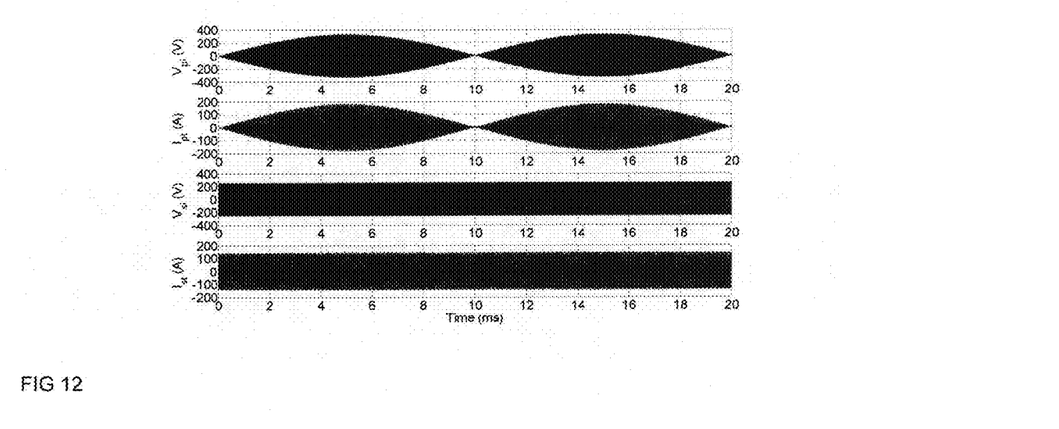
FIGS. 12 and 13 are plots of primary and pick-up line voltages and track currents.
Figure 13:
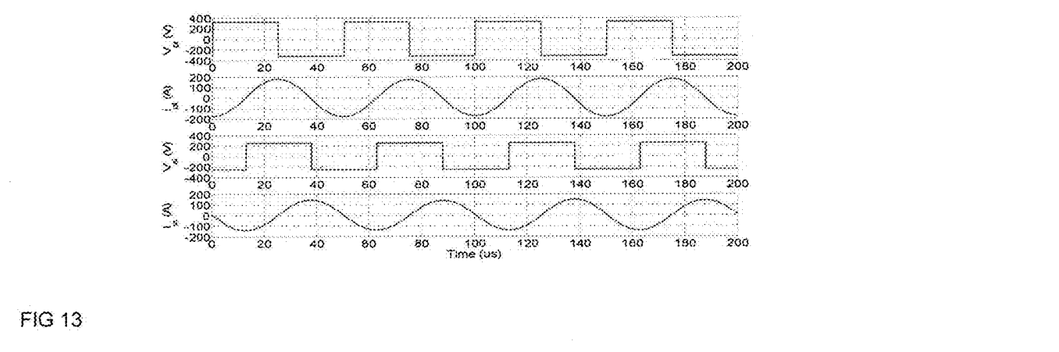

The simulated voltages and currents of both the primary and the pick-up of the proposed IPT system over a 20 ms period are shown in FIG. 12. As predicted from (1) and (5), the voltage $V_{pi}$ and the track current $I_{pt}$ produced by the matrix converter exhibit an envelope of 50 Hz modulation due to time varying input voltage. Since the pick-up is supplied by a DC source, the current in the pick-up inductor $I_{st}$ has a constant amplitude as given by (6). FIG. 13 illustrates a few cycles of these waveforms, and it can be seen that both the matrix converter and the pick-up full-bridge converter are operated at a 50% duty cycle and with a 180 degrees phase shift. The corresponding currents produced in $L_{pt}$ and $L_{st}$ are at 20 kHz and lags the full-bridge converter voltages by 90 degrees as given by (5) and (6). Furthermore, it is evident from the figure that currents $I_{pt}$ and $I_{st}$ are sinusoidal and therefore validate the assumptions made in (5)-(8). The primary track current given by (5), and similarly the pick-up track current, are both independent of the loading and fixed by circuit parameters. However in practice, the track currents will reduce as the load increases due to losses and component tolerances. Therefore the full-bridge converter voltages $V_{pi}$ and $V_{si}$ need to be regulated in order to maintain a constant track current.

Figure 14:
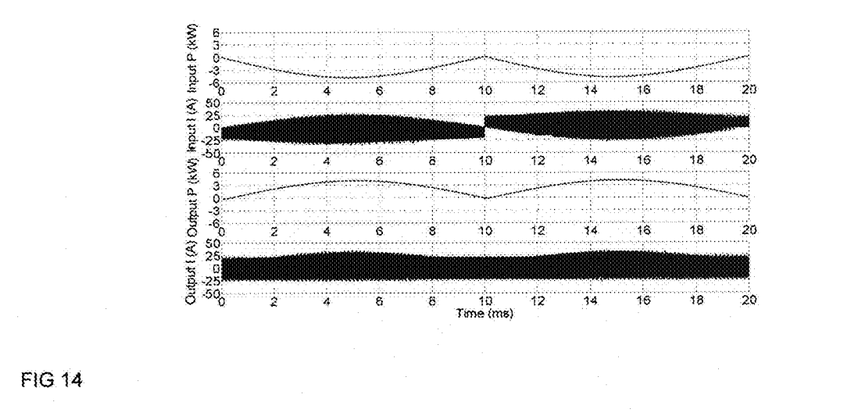
FIG. 14 is a plot of power and ripple currents.

The input and output power of the system along with the input and output currents are shown in FIG. 14. Under the above conditions and according to (12), the IPT system delivers an average output power of 2.8 kW to the load. It can be noted that both the output and the input power exhibit a 100 Hz ripple. This is caused by the 50 Hz modulation that exists in the track current as illustrated in FIG. 12. Since the voltage produced by the pick-up full-bridge converter lags the voltage that produced by the primary matrix converter, a positive power is delivered to the load in accordance with (11). The peak load power is approximately 4 kW. The input current, produced by the control scheme employed in the simulation, appears to generate considerable amounts of 3rd and 5th harmonic currents. However by controlling the full-bridge converter phase angles $\phi_1$ and $\phi_2$ in (10), the harmonics currents can be significantly reduced.

Figure 15:
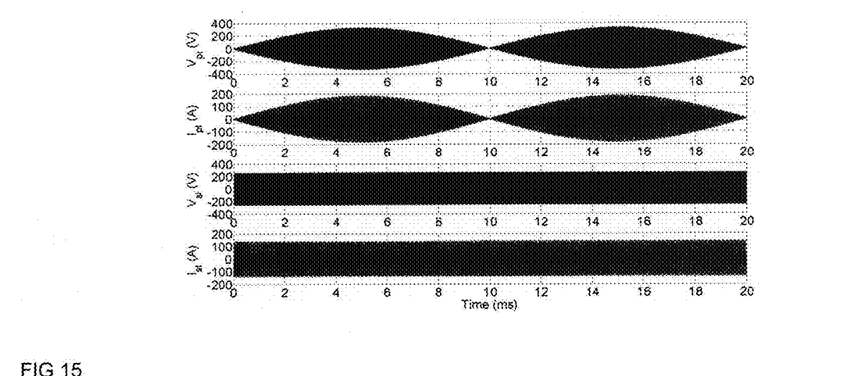
FIGS. 15 and 16 are plots of primary and pick-up line voltages and track currents
Figure 16:
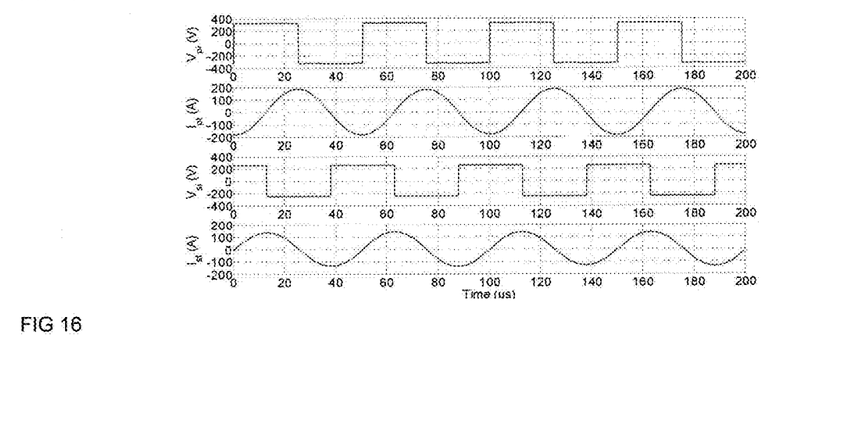

The direction of the power flow between primary and the pick-up can be reversed by driving the pick-up full-bridge converter with a leading phase angle θ. The pick-up of the simulated IPT system is driven at a 90 degrees leading phase angle with respect to the primary full-bridge converter, and the simulations results are shown in FIG. 15 and FIG. 16. As evident from FIG. 16 the pick-up full-bridge converter voltage $V_{si}$ is leading $V_{pi}$ by 90 degrees. However, since the input voltages are unchanged, the primary and pick-up track currents remain constant, regardless of the phase difference between the full-bridge converter.

Figure 17:
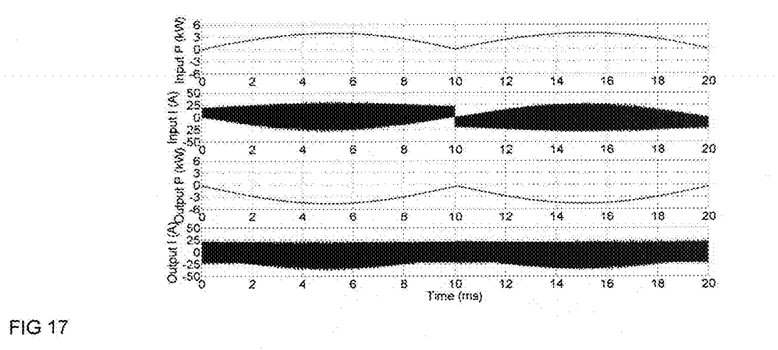
FIG. 17 is a plot of power and ripple currents.
Figure 18:
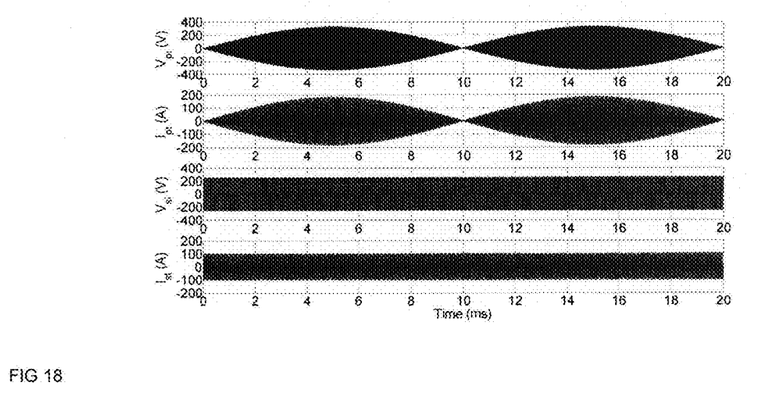
FIGS. 18 and 19 are plots of primary and pick-up line voltages and track currents
Figure 19:
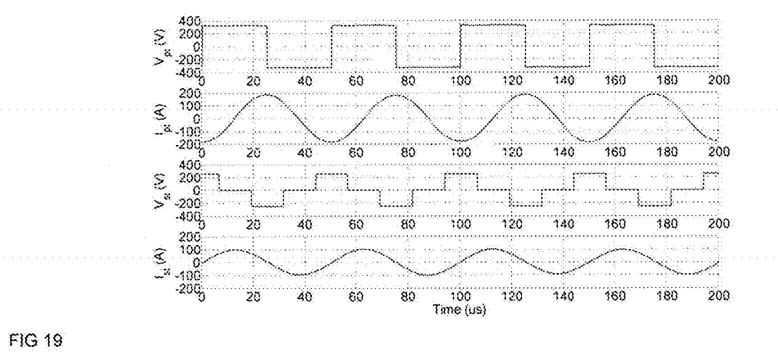
Figure 20:
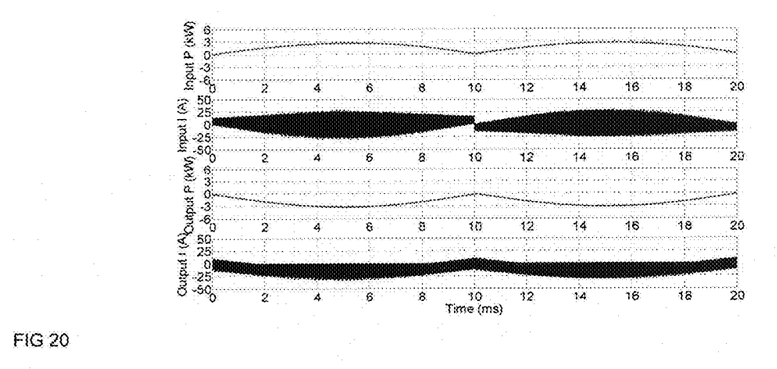
FIG. 20 is a plot of power and ripple currents.

As illustrated in FIG. 17, the pick-up is now delivering about 2.8 kW to the grid through the mutual coupling that exists between the track and the pick-up inductors. As a result, in comparison to FIG. 14, the direction of the current flow has now reversed. According to (12), the power throughput of the converter can be regulated either by changing the relative phase angle θ between the primary and the pick-up full-bridge converters or by varying $\phi_1$ and $\phi_2$. However, the input power factor of this system can be maintained close to unity by maintaining θ at ±90 degrees. Thus the output power of the simulated IPT system is regulated by controlling $\phi_2$, which in turn reduces or increases the pick-up inductor current $I_{st}$. The power throughput of the pick-up can be reduced by reducing the phase difference $\phi_2$ between the switches of the pick-up full-bridge converter. The voltages and currents of the system when $\phi_2$ is reduced to 90 degrees while maintaining θ at +90 degrees are shown in FIG. 16 and FIG. 17. As evident from FIG. 16, the pick-up current $I_{st}$ was reduced to about 70 A in accordance with (6), Consequently the power throughput of the converter was been reduced to about 2 kW as illustrated in FIG. 20.

The IPT system disclosed herein can be used in standby applications where there is a requirement to supply an AC supply, for example 230 V AC, to a load in the event of a grid failure for example. Therefore, the invention provides an IPT system which can be used in both standby and grid connected modes.

Furthermore, the invention is applicable to multiphase systems. Therefore, the invention provides a multiphase matrix converter based IPT system. This has advantages of both lower losses and low current ripples.

The invention provides an IPT system which can also be extended to multiple primary and/or multiple pick-up systems. Furthermore, multiple primary conductive paths i.e. tracks and/or multiple pick-up windings may be used.

In another aspect, the invention also allows both the primary, or primaries and the pick-up, or pick-ups to be either active loads or passive loads. For example, rather than the primary being connected to an AC source, it can be connected to an AC load when the pick-up is connected to a battery (an EV).

From the foregoing it will be seen that the invention provides a novel matrix converter based IPT system that requires only a single stage power conversion process to facilitate contactless and bidirectional power flow. The proposed system wirelessly transfers power through loose magnetic coupling, and a mathematical analysis together with simulation results have been presented to show that the proposed technique is viable and requires a simple control strategy to effectively control both direction and amount of power flow. The proposed IPT power interface is reliable, efficient and low in cost without an additional power conversion stage, and is attractive for applications which require wireless power.

The invention claimed is:

1. An inductive power transfer (IPT system) comprising:
   a primary conductive path adapted to provide a magnetic field for reception by a pick-up device; and
   an AC-AC full-bridge converter provided between the primary conductive path and an alternating current power supply to provide a controlled current to the primary conductive path for provision of the magnetic field,
   wherein the primary conductive path has a frequency which is greater than a frequency of the alternating current power supply when power is being transferred to the pick-up device.

2. An IPT system as claimed in claim 1, further comprising a controller for controlling the pick-up device to shape an input current drawn from the alternating Current power supply.

3. An IPT system as claimed in claim 2 wherein the controller modulates the pick-up device to shape the input current drawn from the alternating current power supply.

4. An IPT system as claimed in claim 2 wherein the pick-up includes a full-bridge converter having two pairs of complementary switches, and the controller controls the pick-up device by controlling a phase angle between the pairs of complementary switches.

5. An IPT system as claimed in claim 1 wherein the alternating current power supply comprises a mains utility power supply.

6. An IPT system as claimed in claim 1 wherein the IPT system comprises a bi-directional IPT system.

7. An IPT system as claimed in claim 1, wherein the AC-AC full-bridge converter connects the primary conductive path to the alternating current power supply to provide a current to the alternating current power supply having a frequency which is less than a frequency of the current in the primary conductive path when power is being transferred to the alternating current power supply.

8. A primary circuit for an IPT system, the primary circuit comprising:
    a primary conductive path adapted to provide a magnetic field for reception by a pick-up device; and
    an AC-AC converter provided between the primary conductive path and an alternating current power supply,
    wherein the primary conductive path has a frequency which is greater than a frequency of the alternating current power supply when is being transferred to the pick-up device.

9. A primary circuit for an IPT system as claimed in claim 8 wherein the alternating current power supply comprises a mains utility power supply.

10. A primary circuit for an IPT system as claimed in claim 8 wherein the primary circuit comprises part of a bi-directional IPT system.

11. A primary circuit for an IPT system as claimed in claim 8 wherein the AC-AC converter connects the alternating current power supply to the primary conductive path to provide a current in the primary conductive path having a frequency which is greater than a frequency of the alternating current power supply when power is being transferred to an IPT pick-up device.

12. A primary circuit for an IPT system as claimed in claim 8 wherein the AC-AC converter connects the primary conductive path to the alternating current power supply to provide a current to the alternating current power supply having a frequency which is less than a frequency of a current in the primary conductive path when power is being transferred from an IPT pick-up device to the alternating current power supply.

13. A method for controlling an inductive power transfer (IPT) system having an AC-AC full-bridge converter provided between an AC power supply and a primary conductive path, the method comprising:
    controlling a pick-up device of the IPT system to shape an input current drawn from an alternating current power supply,
    wherein the primary conductive path has a frequency which is greater than a frequency of the alternating current power supply when power is being transferred to the pick-up device.

14. A method as claimed in claim 13, further comprising modulating operation of the pick-up device to shape an input current drawn from the alternating current power supply.

15. A method as claimed in claim 13 wherein the pick-up device includes a full-bridge converter having two pairs of complementary switches, and the method comprises controlling the pick-up device by controlling a phase angle between the pairs of complementary switches.

16. A method as claimed in claim 13 wherein the alternating current power supply comprises a mains utility power supply.

17. A method as claimed in claim 13 wherein the IPT system comprises a hi-directional IPT system.

18. A method as claimed in claim 13, further comprising controlling the AC-AC full-bridge converter to connect the alternating current power supply to the primary conductive path to provide a current in the primary conductive path having a frequency which is greater than a frequency of the alternating current power supply when power is being transferred to the pick-up device.

19. A method as claimed in claim 13, further comprising controlling the AC-AC full-bridge converter to connect the primary conductive path to the alternating current power supply to provide a current to the alternating current power supply having a frequency which is less than a frequency of a current in the primary conductive path when power is being transferred to the alternating current power supply.

* * * * *